United States Patent [19]
Parsons

[11] Patent Number: 5,386,322
[45] Date of Patent: Jan. 31, 1995

[54] MIRROR ATTACHMENT

[75] Inventor: Kevin L. Parsons, Appleton, Wis.

[73] Assignee: Armament Systems and Procedures, Appleton, Wis.

[21] Appl. No.: 754,791

[22] Filed: Sep. 4, 1991

[51] Int. Cl.⁶ .............................................. G02B 7/18
[52] U.S. Cl. ...................... 359/872; 359/879; 359/882; 248/477; 248/479; 362/135; 273/84 R
[58] Field of Search .............. 359/872, 879, 880, 881, 359/882; 248/472, 474, 477, 479; 273/84 R; 362/135, 157

[56] References Cited

U.S. PATENT DOCUMENTS

| | | | |
|---|---|---|---|
| 998,021 | 7/1911 | Marcy | 359/882 |
| 1,029,420 | 6/1912 | Buzby | 359/880 |
| 1,036,000 | 8/1912 | Plase | 359/882 |
| 1,473,357 | 11/1923 | Pletman | 359/882 |
| 2,180,610 | 11/1939 | Ritz-Woller | 362/135 |
| 2,235,109 | 3/1941 | Morey | 362/135 |
| 2,740,882 | 4/1956 | Soucy | 359/881 |
| 3,385,551 | 5/1968 | McKay | 248/472 |
| 4,163,606 | 8/1979 | Granno | 359/881 |
| 4,349,246 | 9/1982 | Binner | 359/880 |
| 4,751,618 | 6/1988 | Iacovelli | 362/135 |
| 4,752,072 | 6/1988 | Parsons . | |
| 4,856,888 | 8/1989 | Wahl | 359/881 |
| 4,860,989 | 8/1989 | Rose et al. | 359/881 |
| 4,938,578 | 7/1990 | Schmidt et al. | 248/479 |
| 5,076,701 | 12/1991 | Greenlaw | 359/871 |
| 5,106,049 | 4/1992 | Schmidt et al. | 248/487 |

Primary Examiner—Ricky D. Shafer
Attorney, Agent, or Firm—Butler & Binion; Robert C. Curfiss

[57] ABSTRACT

A mirror attachment for a baton, club or other object is described. The mirror attachment includes an arm having a receiving channel for releasably connecting the mirror attachment to the end of the baton. Attached to the arm is a rotatable mirror. The mirror can be angled to observe a variety of locations not readily available to the operator, such as locations above the operator's eye level, below the operator's eye level, or around corners.

6 Claims, 5 Drawing Sheets

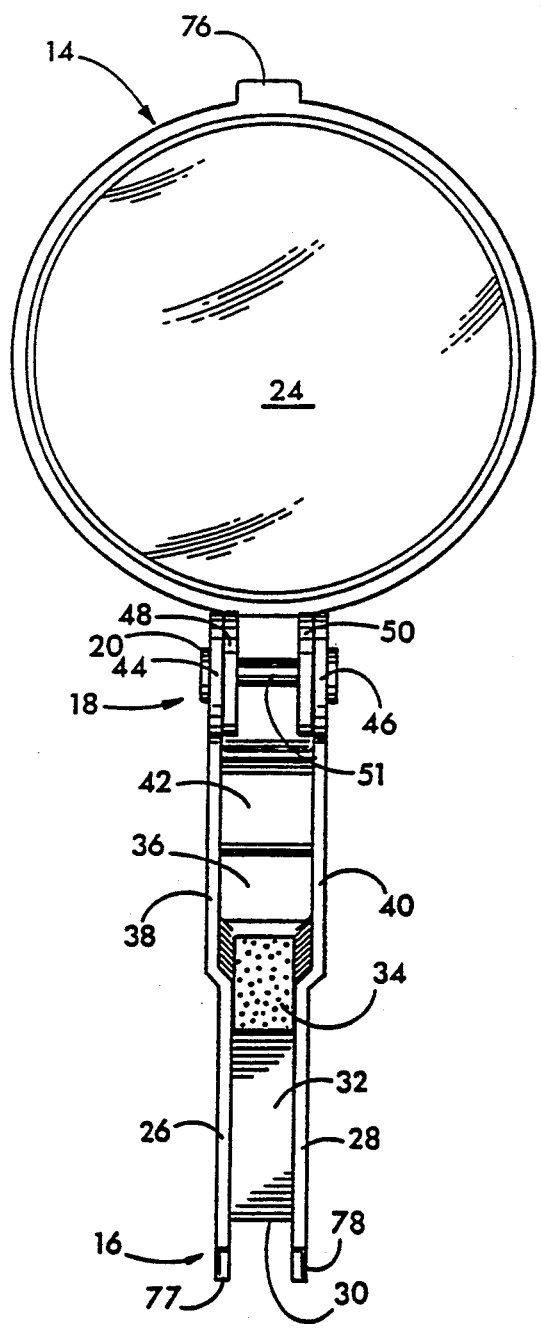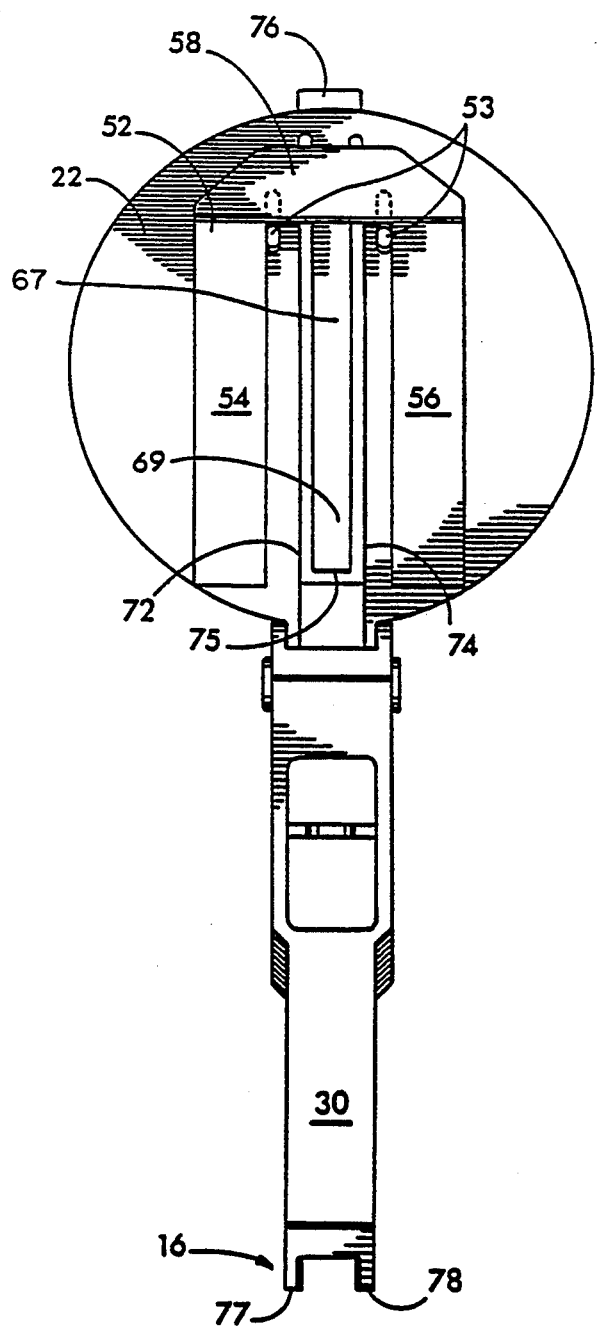

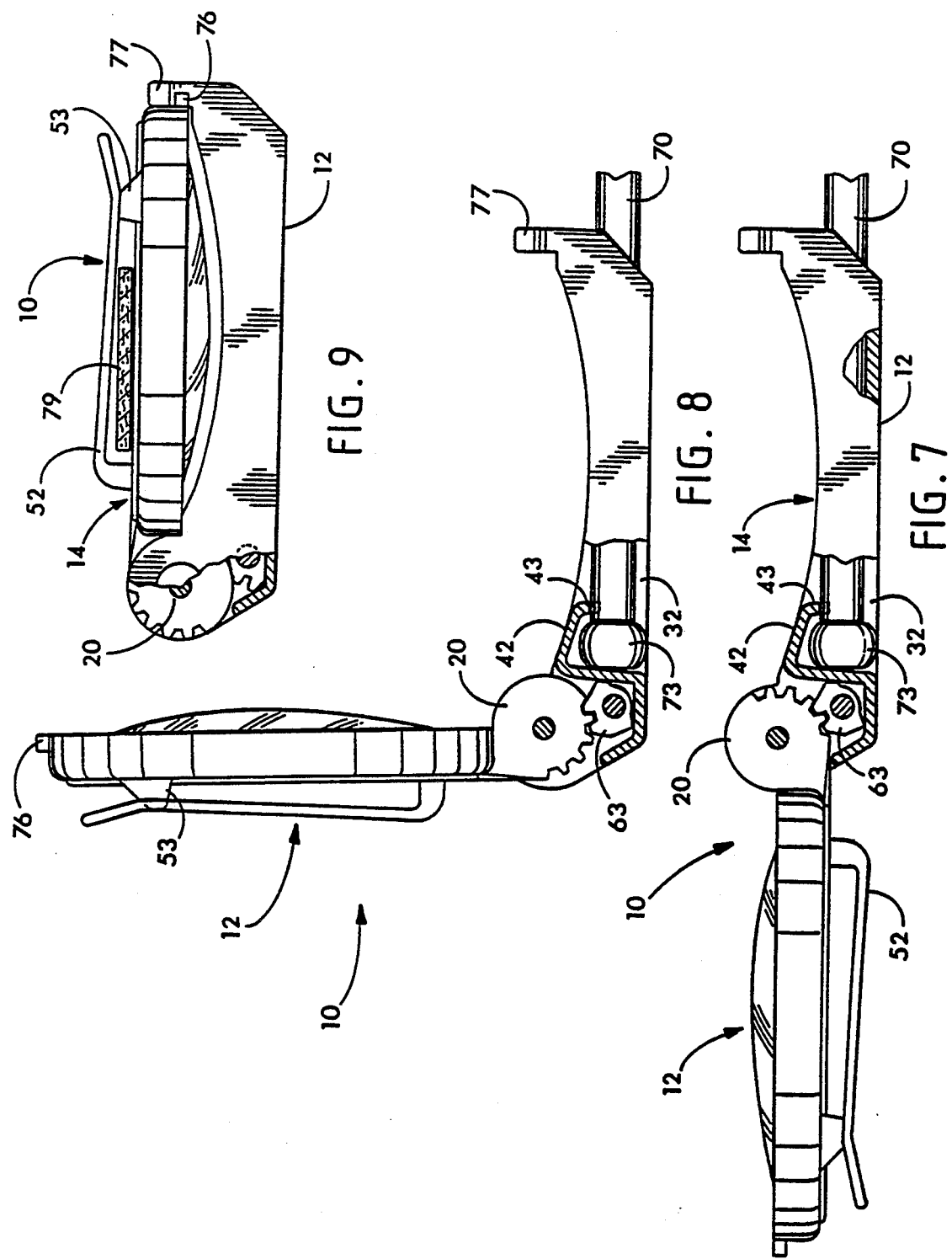

MIRROR ATTACHMENT

FIELD OF THE INVENTION

The present invention is directed to a mirror attachment for the end of a baton, club or the like. The present invention is specifically directed to an attachment for a tactical weapon, such as a police baton, firearm or club, which attachment provides an extension mirror for police work.

BACKGROUND OF THE INVENTION

In many tactical or police-type operations, there is a need to look around corners, over ledges, and generally in areas which are inaccessible due to height, depth or safety considerations. For example, frequently in a combat situation, an individual may be required to look around the corner of a building. However, in the midst of gun fire, such a move might be harmful or even fatal.

Additionally, police officers are often required to search a premise for objects such as contraband. If the search area is out of the individual's eyesight, the logical alternative for the individual is to feel that area with his hands in order to determine whether any objects of interest are present. Such areas include attics, cabinet tops, overhanging ledges, furnace ducts, and the undersides of furniture, automobiles and the like. This search process is both uncomfortable and dangerous, often requiring the individual to obtain a chair or stool to look in elevated areas or to stoop down to look underneath areas close to the ground. Further, it is possible and often likely that contaminated articles, such as needles, broken glass or the like may be in these areas. Placing a hand in the targeted area could result in injury and contamination from disease-bearing organisms on the sharp objects.

In light of this, it would be desirable to develop a safe alternative.

SUMMARY OF THE INVENTION

It is therefore an object of the present invention to provide an alternative means to safely execute various tactical maneuvers, such as peering around a corner or viewing objects in an area generally inaccessible to an individual.

This and other objects are addressed by the present invention which is directed to a mirror attachment for a baton, club, firearm or the like, hereinafter referred to as a "baton." The mirror attachment comprises a receiving channel for connecting the mirror attachment to the end of the baton, and a mirror connected to the channel. Preferably, the mirror is rotatably positioned in the channel. The channel is generally shaped in the form of an arm for attaching the baton to the mirror attachment.

In this manner, the mirror attachment can attach to the end of a baton, the mirror angle can be adjusted with respect to the baton, and the mirror can be used for safely peering around a corner or in an inaccessible area.

Preferably, the mirror attachment can be folded when not in use and clipped to a belt or vest by means of an attachment clip.

In an alternative embodiment, the mirror attachment can include a flashlight channel, which acts in concert with the attachment clip to releasably connect a flashlight to the mirror attachment to illuminate the area to be observed.

The mirror attachment, in combination with a police baton, can then be used in a number of modes, in addition to the uses already described. For example, if the mirror attachment is placed on the baton and the mirror is positioned at an angle, such as a 90° angle with respect to the baton, it can also act as a hooking device. In this manner, the operator can hook an object, such as a door, and pull or push it open. The operator can then peer around the door using the mirror attachment on a baton to view the scene without compromising his safety.

Further objects, features and advantages of the invention will be apparent from the following detailed description when taken in conjunction with the accompanying drawings.

BRIEF DESCRIPTION OF THE DRAWINGS

In the drawings:

FIG. 3 is a front elevational view of the mirror attachment of FIG. 1.

FIG. 4 is a rear elevational view of the mirror attachment of FIG. 1.

FIG. 7 is a partial side cross-sectional view of the mirror attachment of the present invention showing the mirror attachment fully extended.

FIG. 8 is a partial side cross-sectional view of the mirror attachment of FIG. 7 in which the mirror is at a 90° angle with respect to the arm.

FIG. 9 is a partial side cross-sectional view of the mirror attachment of the present invention in fully closed position.

Figure 1:
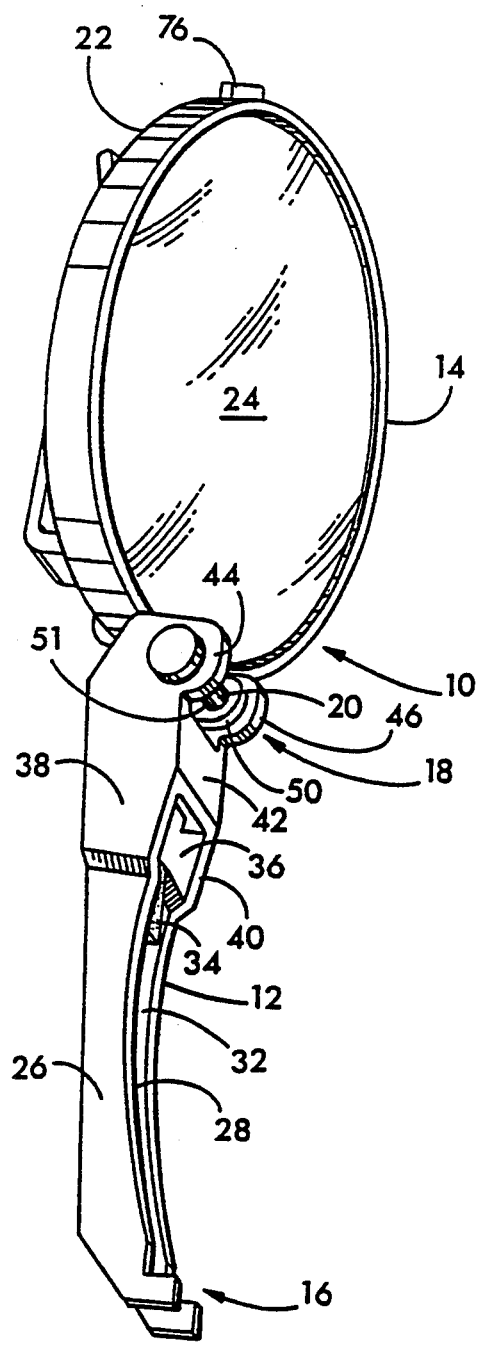
FIG. 1 is front perspective view of the mirror attachment of the present invention.

Referring now to the figures and particularly FIGS. 1-4, there is illustrated a mirror attachment 10 for use with respect to a baton, firearm or the like. While specific reference is made to a baton, it is within the scope of the present invention to use the mirror attachment 10 on the end of any substantially elongated rod. The preferred use of the mirror attachment is with respect to a police baton, as illustrated in, for example, FIGS. 7, 8, 10 and 11.

The mirror attachment 10 is preferably segmented into two parts, an arm or holder 12, having a first end 16 and a second end 18, and a mirror body or frame 14. The arm 12 may be fixedly attached to the mirror body 14 in direct axial alignment, as illustrated in FIGS. 1-4. Alternatively and preferably, the arm 12 is rotatably attached to the mirror body 14 by means of a hinge mechanism 20 located at the second end 18 of the arm 12.

The arm 12 may be made in one piece from any number of materials, including, without limitation, metals such as aluminum, iron, steel, etc., and plastics, such as high-impact plastics and polycarbonates.

The mirror body 14 comprises a mirror backing 22 to which is attached a reflective surface 24. The mirror backing may be made of similar materials as the arm 12. The reflective surface 24 may be any mirror-like reflecting surface known to the art. It is within the scope of the present invention, and preferred, to use a convex mirror as the reflective surface 24 to increase the visual opportunities of the mirror attachment 10.

The arm 12 includes first and second legs 26, 28, joined by a backing member 30, to form a baton channel 32 therein. The purpose of the baton channel 32 is to receive the baton, which will be described more fully hereinafter. A cushioning pad 34 of cloth, foam or the like may be provided in the channel 32 to assist in attaching and maintaining the baton within the channel 32. The cushioning pad 34 is also useful as a frictional gripping surface to prevent the mirror attachment 10 from rotating with respect to the baton.

The baton channel 32 emerges into a retainer chamber 36, located near the second end 18, designed to receive the tip of the baton or the like. The chamber 36 is defined by side walls 38, 40 and a front retaining wall 42 having an angled lip 43. The side walls 38 and 40 extend towards the second end 18 of the arm 12. At the upper most reaches of the side walls 38, 40 are provided channel ears 44, 46, in which the hinge mechanism 20 is located.

Figure 2:
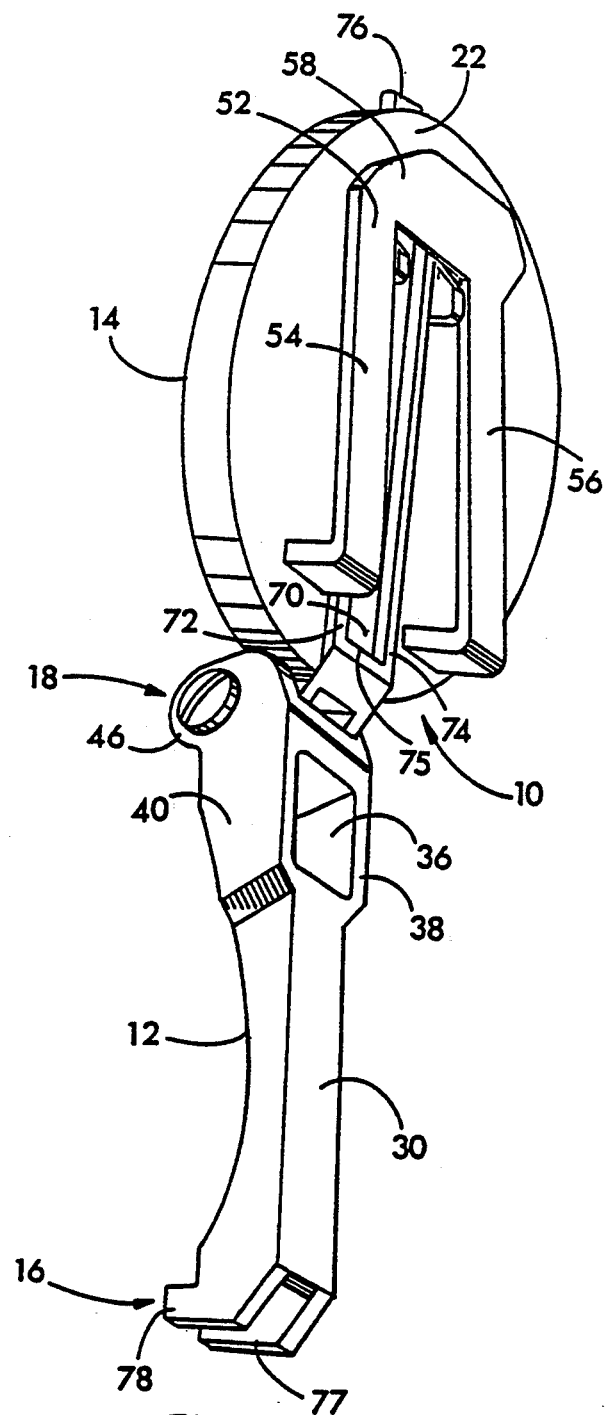
FIG. 2 is a rear perspective view of the mirror attachment of FIG. 1.
Figure 5:
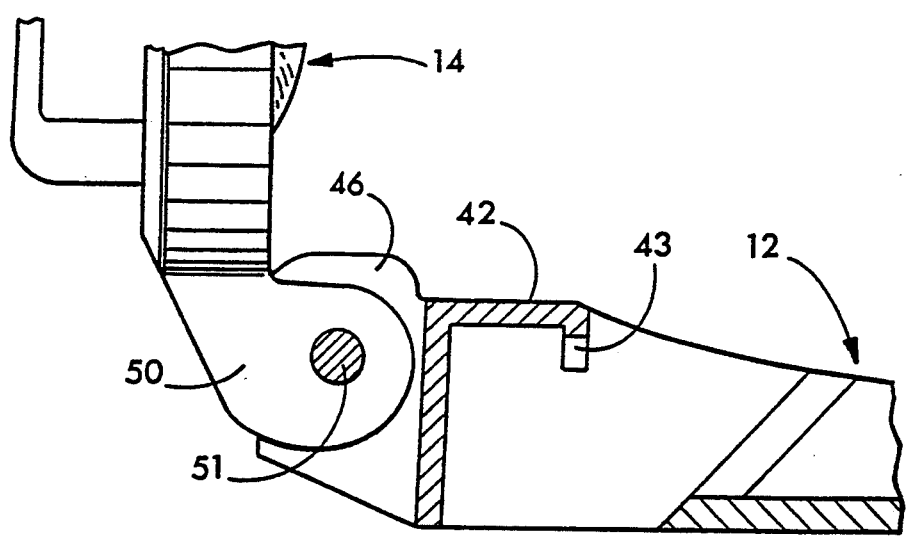
FIG. 5 is a partial side cross-sectional view of the hinge attachment, attaching the mirror and the arm of FIG. 1.

As illustrated in FIGS. 2 and 4, the mirror backing 22 may preferably include an attachment clip 52, which includes a U-shaped bar having two legs 54, 56 attached at right angles to the mirror backing 22. The crest 58 of the U-shaped bar is frictionally engaged on the mirror backing 22.

Figure 10:
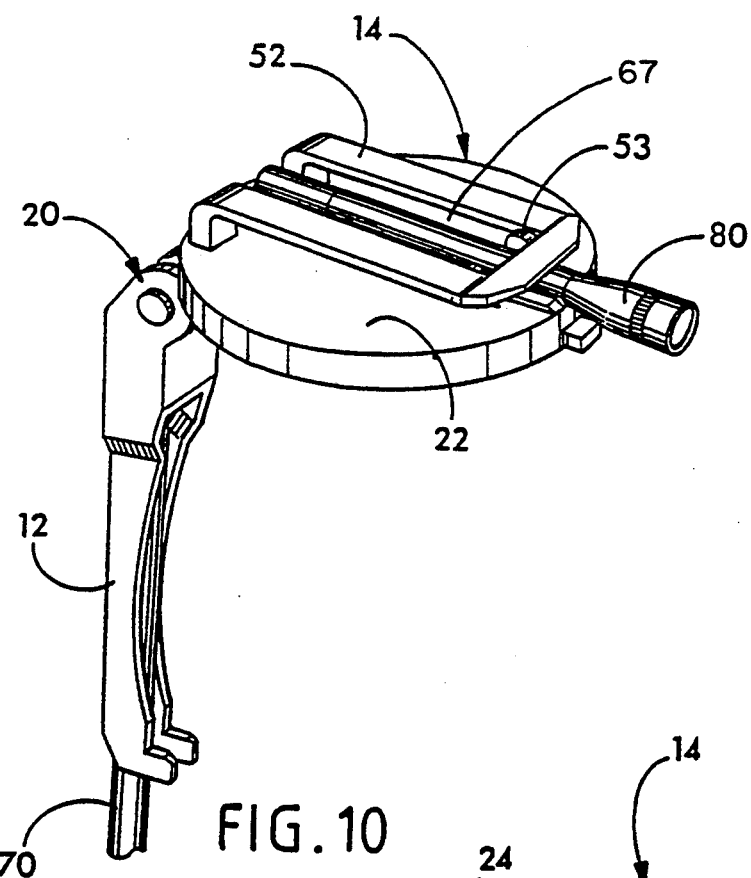
FIG. 10 is a perspective view of the mirror attachment of the present invention illustrating the placement of a flashlight thereon.

Additionally, and preferably, the mirror backing 22 also includes a flashlight holder 67 including the crest 58 and a flashlight channel 69, comprising two sidewalls 72, 74 and an endwall 75. The flashlight holder 67 is designed to hold a flashlight, as illustrated in FIG. 10.

The mirror backing 22 also includes a connection pin 76, which is designed to frictionally engage with retaining clips 77, 78 at the first end 16 of the arm 12 when the mirror attachment 10 is folded into storage shape, as illustrated in FIG. 9.

The hinge mechanism 20 generally includes channel ears 44, 46 of the arm 12. The arm 12 is rotatably connected to the mirror connection ears 48, 50 of the mirror body 14. As illustrated in FIGS. 1-5, the hinge mechanism is provided with a directional screw 51, which can be tightened or loosened, to adjust the angle of mirror body 14 with respect to the arm 12 in a manner known to the art. The directional screw can be in a form suitable for use with a flat-head screwdriver as illustrated in FIG. 2. An alternative directional screw embodiment is a wingnut 53, illustrated in FIG. 11. Other embodiments known to the art are contemplated.

Figure 6:
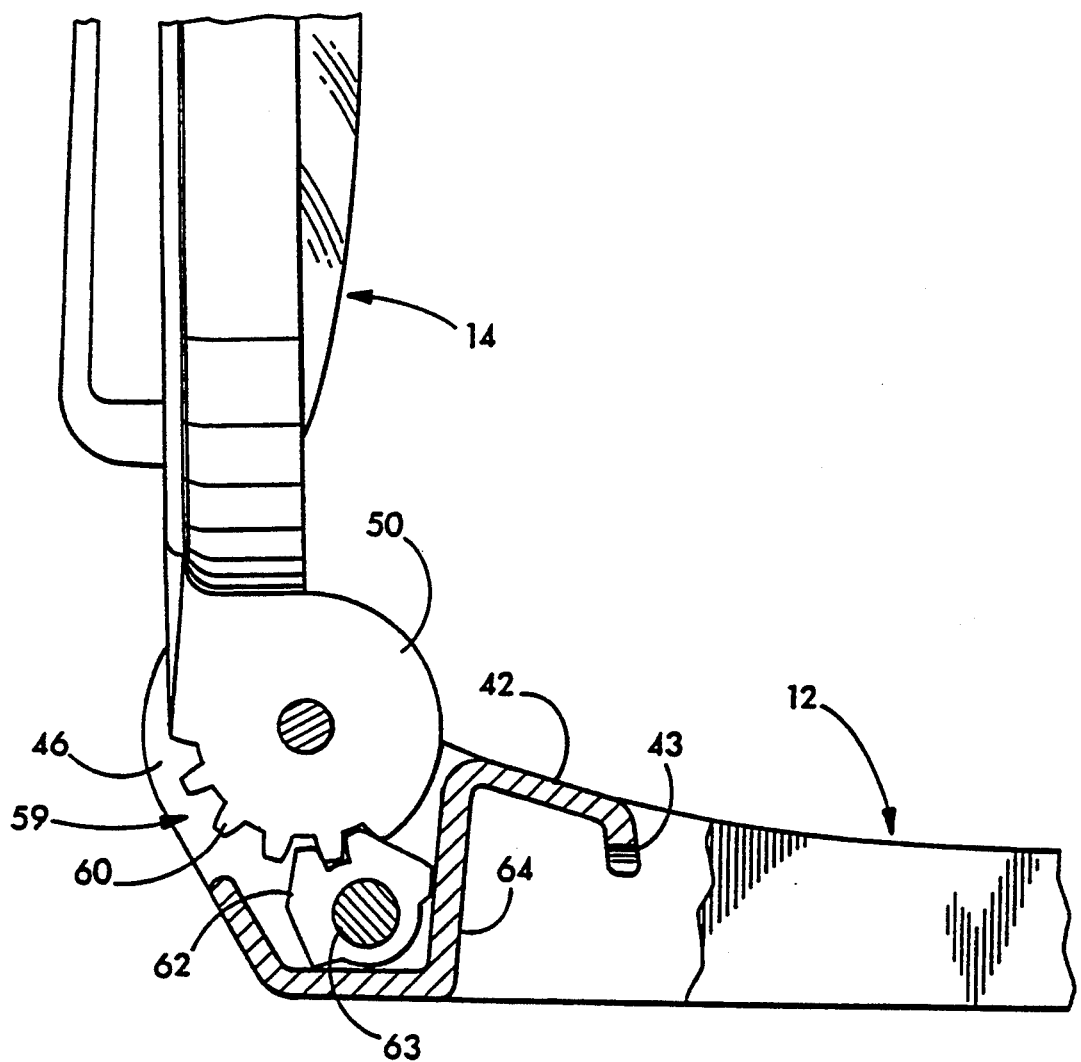
FIG. 6 is an alternative embodiment of the hinge attachment of FIG. 5.

Referring now to FIG. 6, there is illustrated an alternative and preferred embodiment to the hinge mechanism 20. This embodiment provides a positive locking mean in which the frictional engagement illustrated in FIGS. 1-5 is replaced by a ratchet gear mechanism 59. The mirror body or frame has ears 48, 50 which are shaped like a ratchet gear to include teeth 60 designed to communicate with a hinged pawl 62, which is partially rotatably affixed to the ears 44, 46 of the arm 12 by means of a pin 63. The pawl 62 acts in concert with an S-shaped biasing or spring mechanism 64 to resiliently adjust the position of the mirror body 14 with respect to the arm 12. The gear teeth 60 can extend completely around the circumference of the ears 48, 50 of the mirror body 14. Alternatively, and as illustrated, only enough gear teeth 60 must remain on the ears 48, 50 to place the mirror body 14 in lock step position at a 90° angle with respect to the arm 12. When the mirror attachment 10 is then completely folded, as illustrated in FIG. 9, the smooth or non-tooth portion of the ears 48, 50 will ride over the pawl 62, creating slight but still significant frictional engagement of the mirror body 14 with respect to the arm 12.

Reference is now made to FIGS. 7-9 for a description of the operation of the mirror attachment 10. In use, the mirror attachment 10 is releasably attached to a baton 70 by inserting the baton 70 in the baton channel 32 of the arm or holder 12 and locking it in position with the head 73 of the baton 70 resting snugly against the lip 43 of the front retaining wall 42 of the retainer chamber 36. The mirror body 14 is then extended either partially (as illustrated in FIG. 8) or fully (as illustrated in FIG. 7) for use. The baton 70 can be of any practical length. A description of a suitable baton is found in Parsons U.S. Pat. No. 4,752,072, which describes a telescoping baton. Such a baton would be useful for the mirror attachment 10.

Referring now to FIG. 9, there is illustrated the mirror attachment 10 of the present invention in stored condition. As illustrated, the mirror attachment 10 may be conveniently carried by clipping the attachment clip 52 onto an article of clothing, such as a belt 79. Retainer elements 53 are provided to assist in securing the attachment of the clip 52 to the belt 79.

Referring now to FIG. 10, there is illustrated a further embodiment of the mirror attachment 10 of the present invention, in which a flashlight 80 has been removably attached thereon by the flashlight holder 67. The flashlight 80 is preferably a small diameter flashlight designed to hold AA batteries. In use, the flashlight 80 is slipped in the flashlight holder 67 into the flashlight channel 69 between the sidewalls 72, 74 and endwall 75, illustrated on FIG. 2, and held into position by means of the U-bar 58 of the attachment clip 52. The endwall 75 is useful to prevent the flashlight 80 from slipping out of the flashlight channel 69, especially if the mirror attachment 10 is used to push an object such as a door, attic latch cover or the like. When activated, the flashlight will illuminate the area surrounding the mirror body or frame 14.

Figure 11:
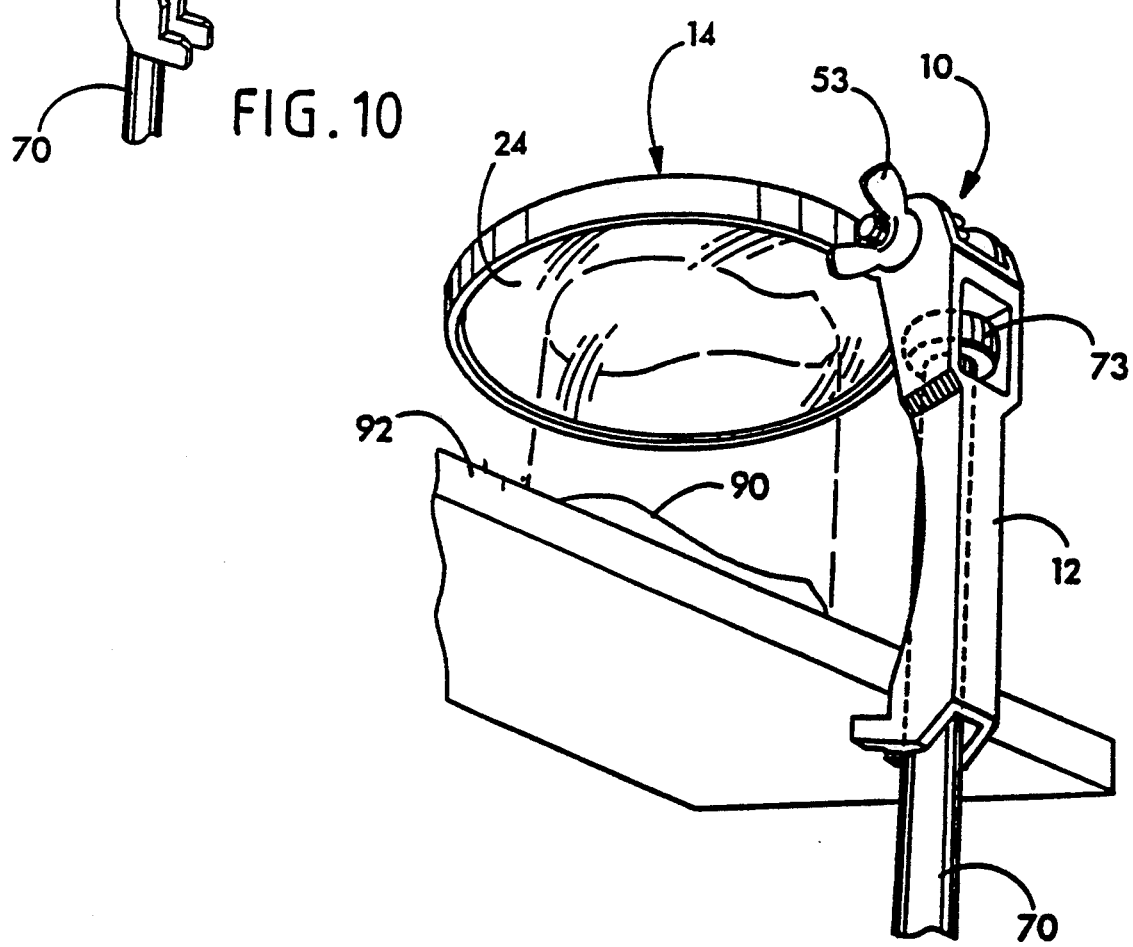
FIG. 11 is a perspective view of the mirror attachment of the present invention illustrating a potential use of the invention.

As illustrated in FIG. 11, the mirror attachment 10 may be used to observe articles 90, placed on shelves 92 above the operator's eyesight. By placing the mirror body 14 at a proper angle with respect to the baton 70, the specimen 90 may be readily observed.

The present invention therefore provides a variety of advantages to the operator. In use, the mirror attachment easily clips onto the end of a batons club, firearm or other extendable object. The angle of the mirror can then be adjusted for proper viewing. The mirror can then be used to push open doors or to hook and pull doors. The mirror attachment can also assist the operator in looking around corners, seeing above eye level, seeing under eye level, and observing spaces having limited light, with the use of a flashlight.

When not in use, the mirror attachment can be easily folded and clipped onto a belt or other article of clothing.

It is understood that the invention is not confined to the particular construction and arrangement herein illustrated and described, but embraces such modified forms thereof as come within the scope of the following claims:

What is claimed is:

1. A quick connect mirror for a police baton, and the mirror attachment comprising:
   a. a frame;
   b. a mirror mounted in the frame;
   c. a holder secured to and extending from the frame and including a channel adapted for receiving an end of the police baton;
   d. a retainer on the holder adapted for engaging and gripping the baton when the baton is received in said channel; and
   e. a flashlight holder secured to the frame and adapted for securing an elongated flashlight to the frame, wherein the flashlight holder includes a flashlight channel extending along the back of the mirror in an axial direction with respect to the receiving channel.

2. The mirror attachment of claim 1 wherein the flashlight holder further includes a retainer clip to maintain the flashlight in the flashlight channel.

3. A quick connect mirror attachment for a police baton, the mirror attachment comprising:
   a. a frame;
   b. a mirror mounted in the frame;
   c. a holder secured to and extending from the frame and including a channel which is rotatably connected to the frame by a gear system and is adapted for receiving an end of the police baton;
   d. means mounted between the holder and the frame and adapted for securing the frame to the holder in a manner permitting angular adjustment of the frame relative to the holder; and
   e. a retainer on the holder and adapted for engaging and gripping the baton when the baton is received in said channel.

4. A quick connect mirror attachment for a police baton, the mirror attachment comprising:
   a. a frame;
   b. a mirror mounted in the frame;
   c. a holder secured to and extending from the frame and including a channel which is rotatably connected to the frame by a gear system and is adapted for receiving an end of the police baton;
   d. means mounted between the holder and the frame and adapted for securing the frame to the holder in a manner permitting angular adjustment of the frame relative to the holder; and
   e. a retainer on the holder and adapted for engaging and gripping the baton when the baton is received in said channel wherein said retainer further includes means for maintaining the mirror attachment in a closed position.

5. A quick connect mirror attachment for a police baton, the mirror attachment comprising:
   a. a frame;
   b. a mirror mounted in the frame;
   c. a holder secured to and extending from the frame and including a channel adapted for receiving an end of the police baton; and
   e. a retainer adapted to form a snap fit with the baton for engaging and gripping the baton when the baton is received in said channel wherein said retainer further comprises a clip adapted for attaching the mirror attachment to a belt of a uniform.

6. A quick connect mirror attachment for a police baton, the mirror attachment comprising:
   a. a frame;
   b. a mirror mounted in the frame;
   c. a holder secured to and extending from the frame and including a channel adapted for receiving an end of the police baton wherein said channel further includes a baton cushioning pad;
   d. means mounted between the holder and the frame and adapted for securing the frame to the holder in a manner permitting angular adjustment of the frame relative to the holder; and
   e. a retainer on the holder and adapted for engaging and gripping the baton when the baton is received in said channel.

* * * * *